(12) United States Patent
Okumura et al.

(10) Patent No.: US 11,385,176 B2
(45) Date of Patent: Jul. 12, 2022

(54) COVER DEVICE FOR NEAR-INFRARED SENSORS

(71) Applicant: TOYODA GOSEI CO., LTD., Kiyosu (JP)

(72) Inventors: Koji Okumura, Kiyosu (JP); Shintarou Okawa, Kiyosu (JP); Hiroaki Ando, Kiyosu (JP); Hirotaka Fukui, Kiyosu (JP); Yoshiharu Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 136 days.

(21) Appl. No.: 16/640,167

(22) PCT Filed: Aug. 20, 2018

(86) PCT No.: PCT/JP2018/030710
§ 371 (c)(1),
(2) Date: Feb. 19, 2020

(87) PCT Pub. No.: WO2019/058834
PCT Pub. Date: Mar. 28, 2019

(65) Prior Publication Data
US 2020/0363329 A1 Nov. 19, 2020

(30) Foreign Application Priority Data
Sep. 22, 2017 (JP) .............................. JP2017-182772

(51) Int. Cl.
*G01N 21/359* (2014.01)
*F21S 43/20* (2018.01)
*G02B 5/26* (2006.01)

(52) U.S. Cl.
CPC .............. *G01N 21/359* (2013.01); *F21S 43/20* (2018.01); *G02B 5/26* (2013.01)

(58) Field of Classification Search
CPC ......... G01N 21/359; F21S 43/20; G02B 5/26; G02B 5/281; G02B 5/208; B60R 13/04; G01S 7/481
See application file for complete search history.

(56) References Cited

U.S. PATENT DOCUMENTS

2005/0099678 A1* 5/2005 Wang ..................... G02B 5/208
359/359
2006/0083015 A1 4/2006 Yamazaki et al.
(Continued)

FOREIGN PATENT DOCUMENTS

EP 1837920 A1 9/2007
JP 2003-004942 A 1/2003
(Continued)

OTHER PUBLICATIONS

Extended European Search Report dated Apr. 6, 2021, issued in corresponding European Application No. 18858249.8.
(Continued)

*Primary Examiner* — Christine S. Kim
(74) *Attorney, Agent, or Firm* — Posz Law Group, PLC (57) ABSTRACT

In a cover device for a near-infrared sensor, a plate-shaped cover is arranged in a vehicle such that near-infrared light transmitted from a near-infrared sensor passes through the cover in the thickness direction. A part of the cover in the thickness direction is constituted by a bright decorative layer, which reflects part of incident visible light and allows near-infrared light to pass through. The cover is configured such that the near-infrared light transmittance is higher than the visible light transmittance. The vehicle further includes a light emitting portion, which emits visible light to the cover.

6 Claims, 6 Drawing Sheets

(56) References Cited

U.S. PATENT DOCUMENTS

| | | | | |
|---|---|---|---|---|
| 2008/0036576 A1* | 2/2008 | Stein | ............... | G08G 1/167 |
| | | | | 340/425.5 |
| 2008/0316594 A1* | 12/2008 | Hashiguchi | ............ | G02B 5/281 |
| | | | | 359/359 |
| 2016/0282155 A1 | 9/2016 | Hara | | |
| 2019/0025481 A1* | 1/2019 | Du | ............... | G02B 5/206 |

FOREIGN PATENT DOCUMENTS

| | | |
|---|---|---|
| JP | 2003-42841 A | 2/2003 |
| JP | 2006-117048 A | 5/2006 |
| JP | 2011-093378 A | 5/2011 |
| JP | 2014-070899 A | 4/2014 |
| JP | 2016-179752 A | 10/2016 |
| WO | 94/09392 A1 | 4/1994 |
| WO | 2017/124664 A1 | 7/2017 |

OTHER PUBLICATIONS

International Search Report of the International Searching Authority dated Nov. 20, 2018 for the corresponding international application No. PCT/JP2018/030710 (and English translation).

* cited by examiner

COVER DEVICE FOR NEAR-INFRARED SENSORS

CROSS REFERENCE TO RELATED APPLICATIONS

This application is a U.S. national stage application of International Application No. PCT/JP2018/030710, filed on Aug. 20, 2018, which claims priority to Japanese Patent Application No. 2017-182772 filed on Sep. 22, 2017, the contents of which are incorporated herein by reference.

BACKGROUND

The present invention relates to a cover device for a near-infrared sensor that is arranged to cover a near-infrared sensor from the front side in the transmission direction of near-infrared light transmitted from the near-infrared sensor.

In the field of vehicles, the technology has been developed that detects the distance to an obstacle and the relative speed of the obstacle by transmitting near-infrared light to the surroundings of a vehicle and detecting the near-infrared light that has hit and been reflected by an obstacle such as a leading vehicle and a pedestrian.

In a vehicle equipped with a sensor for detecting obstacles, a cover may be provided to cover the sensor from the front side in the transmission direction of signals transmitted from the sensor (for example, Patent Document 1). The cover disclosed in Patent Document 1 is formed by a plate made of plastic that is transparent to the signals. Since the cover is transparent to the signals, the function of detecting obstacles is ensured. When provided, a cover conceals a sensor for detecting obstacles (a laser radar or an ultrasonic sensor) from the outside of the vehicle. This improves the appearance of the vehicle.

PRIOR ART DOCUMENT

Patent Document

Patent Document 1: Japanese Laid-Open Patent Publication No. 2016-179752

SUMMARY

In addition to mere concealment of the sensor from the outside of the vehicle, there is a demand for added values of the cover. Specifically, improvement of the design of the part in which a near-infrared sensor is provided is desired in order to further improve the design of the vehicle.

Accordingly, it is an objective of the present invention to provide a cover device for a near-infrared sensor that further improves the design while ensuring the detection function of the near-infrared sensor.

To achieve the foregoing objective, a cover device for a near-infrared sensor is provided. The cover device is arranged to cover a near-infrared sensor from a front side in a transmission direction of near-infrared light transmitted from the near-infrared sensor. The cover device includes a plate shaped cover and a light emitting portion. The cover is arranged in a vehicle such that near-infrared light transmitted from the near-infrared sensor passes through the cover in a thickness direction of the cover. A part of the cover in the thickness direction is constituted by a bright decorative layer, which reflects part of incident visible light and allows near-infrared light to pass through. The cover is configured such that a near-infrared light transmittance is higher than a visible light transmittance. The light emitting portion emits visible light to the cover.

In the above-described configuration, the cover is provided to cover the near-infrared sensor from the front side in the transmission direction of the near-infrared light transmitted from the near-infrared sensor. However, since the near-infrared light transmittance of the cover is relatively high, the cover does not hamper transmission and reception of near-infrared light. This ensures the obstacle detecting function of the near-infrared sensor. When sunlight (visible light) is incident on the cover from the outside of the vehicle, part of the visible light is reflected, so that the cover shines. This improves the design of the part in which the cover is provided. In addition, when the light emitting portion emits visible light to the cover, part of the emitted light passes through (or is reflected by) the cover, so that the side of the cover corresponding to the outside of the vehicle shines. This further improves the design of the part in which the cover is provided. Accordingly, the above-described configuration further improves the design while ensuring the detection function of the near-infrared sensor.

In the above-described device, the visible light transmittance of the cover may be higher than or equal to 5% and lower than or equal to 50%.

In the above-described device, a main part of the cover in the thickness direction may be constituted by a transparent or translucent base, and the bright decorative layer may be located closer to the near-infrared sensor than the base.

This configuration prevents the bright decorative layer of the cover from being scratched by obstacles from the outside of the vehicle as compared to a case in which a bright decorative layer is located farther from the near-infrared sensor than the base (that is, a case in which the bright decorative layer is located on the side of the base corresponding to the outside of the vehicle). Accordingly, the design of the bright decorative layer and the detection accuracy for obstacles are prevented from being deteriorated by scratches on the bright decorative layer.

In the above-described device, a main part of the cover in the thickness direction may be constituted by a transparent or translucent base, and the bright decorative layer may be located farther from the near-infrared sensor than the base.

In the above-described configuration, the bright decorative layer is located on the side of the base corresponding to the outside of the vehicle. This allows the bright decorative layer to be easily seen from the outside of the vehicle as compared to a case in which the bright decorative layer is located closer to the near-infrared sensor than the base (that is, a case in which the bright decorative layer is located on the side of the base corresponding to the inner side of the vehicle). This allows the bright decorative layer to shine and thus improves the design of the cover in a favorable manner.

In the above-described device, the light emitting portion may be arranged to emit the visible light to a surface of the bright decorative layer on a side closer to the near-infrared sensor.

This configuration allows part of the visible light emitted by the light emitting portion to pass through the bright decorative layer. The visible light that passes through the bright decorative layer causes the bright decorative layer to shine.

In the above-described device, the light emitting portion may be arranged to emit the visible light to a surface of the bright decorative layer on a side farther from the near-infrared sensor.

This configuration allows part of the visible light emitted by the light emitting portion to be reflected by the bright decorative layer. The reflected visible light causes the bright decorative layer to shine.

The present invention further improves the design while ensuring the detection function of the near-infrared sensor.

DETAILED DESCRIPTION OF THE PREFERRED EMBODIMENTS

First Embodiment

A cover device for a near-infrared sensor according to a first embodiment will now be described.

Figure 1:
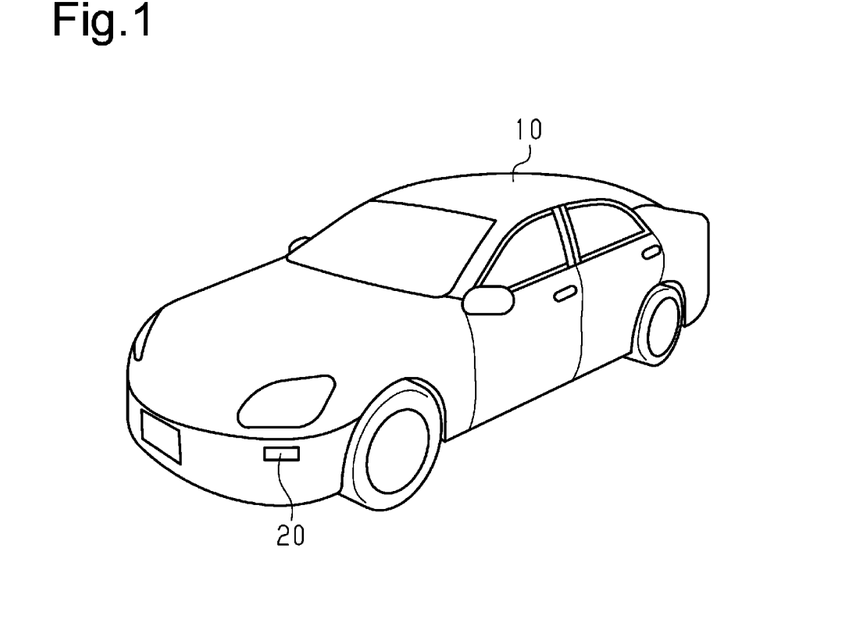
FIG. 1 is a perspective view of a vehicle equipped with a cover device for a near-infrared sensor according to a first embodiment.
Figure 2:
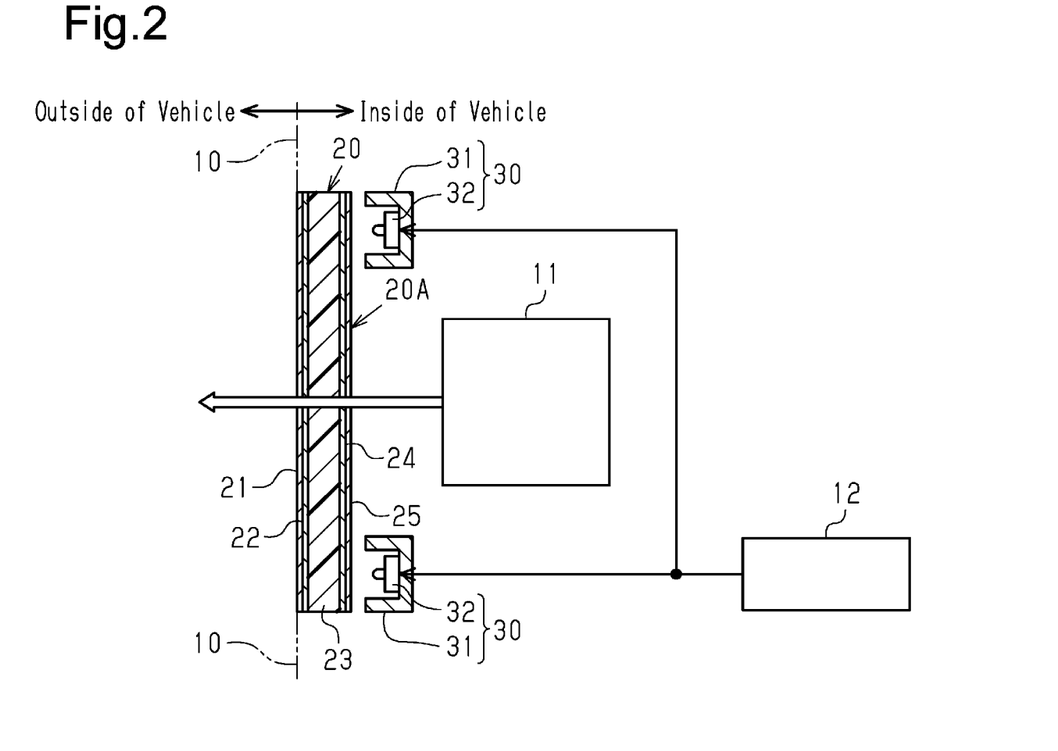
FIG. 2 is a cross-sectional side view of the cover device for a near-infrared sensor according to the first embodiment.

As shown in FIGS. 1 and 2, a vehicle 10 has sets of a near-infrared sensor 11 and a cover 20 provided at the four corners in a plan view (the right front corner, the left front corner, the right rear corner, and the left rear corner). FIG. 1 shows only the cover 20 provided in the left front corner of the vehicle 10. The near-infrared sensors 11 (FIG. 2) and the covers 20 in the four positions are identical. Thus, only the near-infrared sensor 11 and the cover 20 in the left front corner of the vehicle 10 will be described, and description of the other three near-infrared sensors 11 and the corresponding covers 20 is omitted.

As shown in FIG. 2, the near-infrared sensor 11 has a substantially rectangular parallelepiped shape and is fixed to the body of the vehicle 10. The cover 20 is an exterior component for the vehicle 10 and is a plate having a five-layer structure. The cover 20 is fixed to the body of the vehicle 10. The cover 20 is arranged to cover the near-infrared sensor 11 from the front side in the transmission direction of near-infrared light transmitted from the near-infrared sensor 11 (indicated by the blank arrow in FIG. 2). The near-infrared light transmitted from the near-infrared sensor 11 passes through the cover 20 in the thickness direction (the left-right direction as viewed in FIG. 2).

The cover 20 includes a reflection suppression layer 21, a hard coating layer 22, a base 23, a bright decorative layer 24, and a reflection suppression layer 25 in order from the side corresponding to the outside of the vehicle 10 (the left side in FIG. 2). In FIG. 2, the thickness of the reflection suppression layers 21, 25, the thickness of the hard coating layer 22, and the thickness of the bright decorative layer 24 are exaggerated in comparison with the actual thicknesses in order to facilitate understanding.

The reflection suppression layer 21 is made of silicon dioxide having uniform and regular fine pores (mesoporous silica). The reflection suppression layer 21 suppresses reflection of visible light (sunlight and the like) incident on the cover 20 from outside the vehicle (from the left side in FIG. 2).

The hard coating layer 22 is made of a hard plastic. The hard coating layer 22 limits scratches on the cover 20 caused by contact with obstacles such as flying pebbles. The hard coating layer 22 is formed by applying a surface treatment agent (for example, an acrylate-based hard coating agent) to the surface of the base 23.

The base 23 is made of a transparent plastic (polycarbonate). The base 23 constitutes the main part of the cover 20 in the thickness direction of the cover 20.

The bright decorative layer 24 is made of a dielectric multilayer film that is formed by alternately laminating dielectric films made of a high refractive index material and dielectric films made of a low refractive index material, which has a relatively low refractive index. In the present embodiment, titanium dioxide [$TiO_2$] is used as the high refractive index material. In the present embodiment, silicon dioxide [$SiO_2$] is used as the low refractive index material. In the present embodiment, a total of twenty-five dielectric films are laminated together.

In general, a reflective film having a high reflectance is obtained by alternately stacking dielectric films having a high refractive index and dielectric films having a low refractive index. In the dielectric multilayer film, slight reflection occurs at the boundary between adjacent dielectric films. The thickness of each dielectric film in the dielectric multilayer film is adjusted to an optical path length of $\lambda/4$ (refractive index n×film thickness d). Accordingly, the phases of the rays reflected by the respective layers of the dielectric multilayer film are equalized, so that the rays reflected by the respective layers of the dielectric multilayer film intensify each other. In contrast, the rays of light that are multiply reflected in the dielectric multilayer film and advance in the transmission direction cancel out each other. Since light is scarcely absorbed by the dielectric multilayer film, the transmittance and the refractive index can be set in wide ranges. In the present embodiment, since the above-described dielectric multilayer film is employed, the bright decorative layer 24 reflects part of the incident visible light and allows most of the remaining light to pass through, while allowing most of the incident near-infrared light to pass through. The wavelength of the incident visible light is in the range from 0.36 μm to 0.83 μm, and the wavelength of the incident near-infrared light is in the range from 0.83 μm to 3.00 μm.

Figure 3:
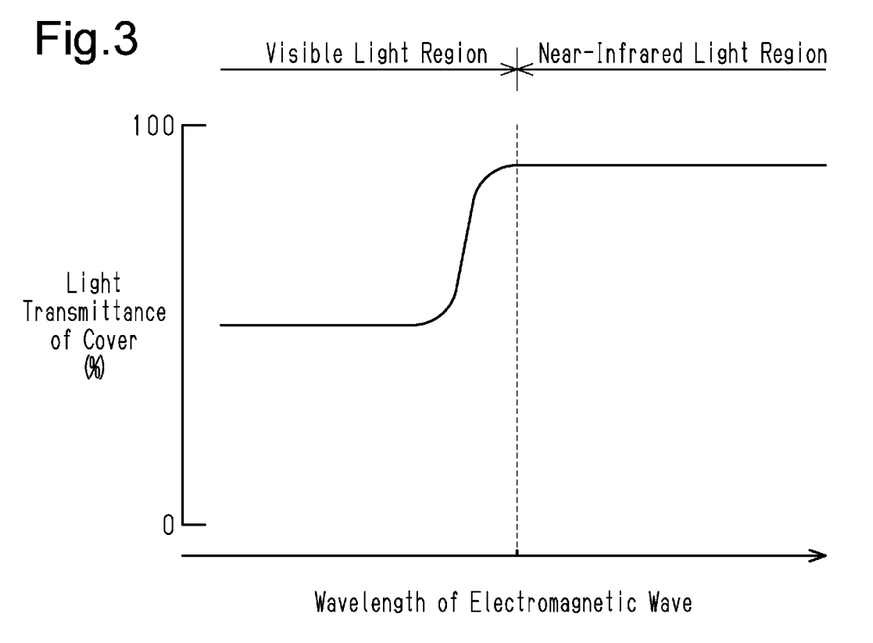
FIG. 3 is a graph showing the relationship between the wavelengths of electromagnetic waves and the light transmittance of the cover according to the first embodiment.

In the present embodiment, the cover 20 is configured such that the near-infrared light transmittance is higher than the visible light transmittance due to the above-described characteristics of the bright decorative layer 24. Specifically, as shown in FIG. 3, the characteristics of the respective layers of the cover 20 (the material, structure, and shape) are determined such that the visible light transmittance (specifically, the transmittance of sunlight, which has wavelengths in the range from 0.40 μm to 0.70 μm) is 50%, and the near-infrared light transmittance is 90%. More specifically, the cover 20 is configured such that the average of the light transmittance in the wavelength region of sunlight (0.40 µm to 0.70 µm) is 50%.

As shown in FIG. 2, the reflection suppression layer 25 is made of mesoporous silica as in the case of the reflection suppression layer 21. The reflection suppression layer 25 suppresses reflection of the near-infrared light transmitted from the near-infrared sensor 11 on the cover 20.

The vehicle 10 includes light emitting portions 30. Each light emitting portion 30 is located closer to the corresponding near-infrared sensor 11 than the corresponding cover 20 (on the right side of the cover 20 as viewed in FIG. 2). Each light emitting portion 30 includes a case 31 having a shape of a closed loop and light emitting diodes 32 (only two of which are shown in FIG. 2). The case 31 extends along the outer periphery of the cover 20. The light emitting diodes 32 are fixed to the bottom of the case 31. The case 31 extends to have an opening facing the outer periphery of the cover 20 and is fixed to the body of the vehicle 10. The light emitting diodes 32 are accommodated in the case 31 to be arranged at intervals along the outer periphery of the cover 20. When the light emitting diodes 32 in the case 31 are turned on, the light emitting portion 30 emits visible light to the surface of the cover 20 on the side closer to the near-infrared sensor 11 (a back surface 20A).

The vehicle 10 is provided with an electronic control unit 12, which is mainly constituted by, for example, a microcomputer. The electronic control unit 12 is connected to various types of sensors that detect the driving state of the vehicle 10, operating switches for operating in-vehicle devices, and the light emitting diodes 32 of the light emitting portions 30. The electronic control unit 12 receives output signals of the sensors and the operating switches, executes calculations based on the signals, and controls operation (turning on/off) of the light emitting portions 30 (specifically, the light emitting diodes 32) based on the calculation result.

In the operation control of the light emitting portions 30, the light emitting diodes 32 may be turned on in conjunction with turning on of the headlights of the vehicle 10. For example, the light emitting diodes 32 are turned on when the headlights are turned on, and the light emitting diodes 32 are turned off when the headlights are turned off. In the operation control of the light emitting portions 30 in a vehicle having a self-driving feature, the light emitting diodes 32 may be turned on in conjunction with execution of self-driving operation. For example, the light emitting diodes 32 are turned off when the self-driving operation is not executed, and are turned on when the self-driving operation is executed.

The operation and advantages of the cover device for a near-infrared sensor of the present embodiment will now be described.

Figure 4:
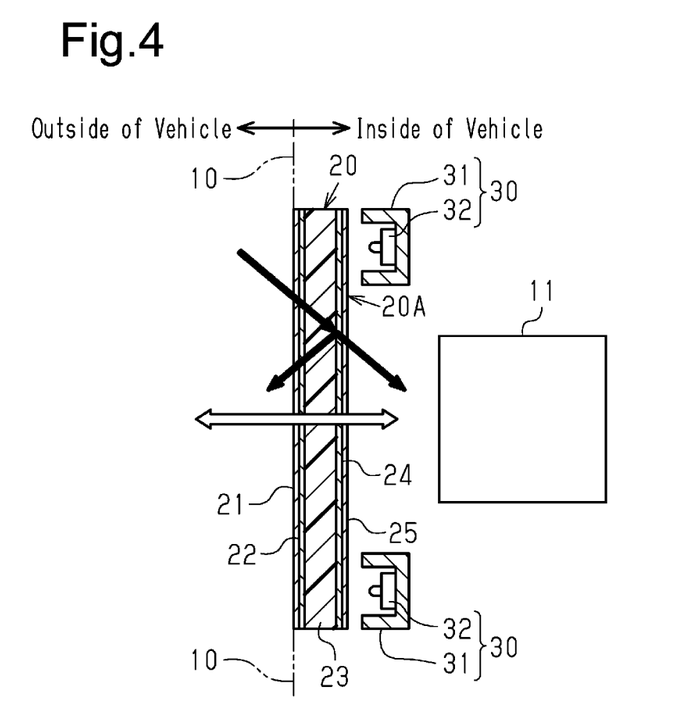
FIG. 4 is an operation diagram of the cover device for a near-infrared sensor according to the first embodiment.
Figure 5:
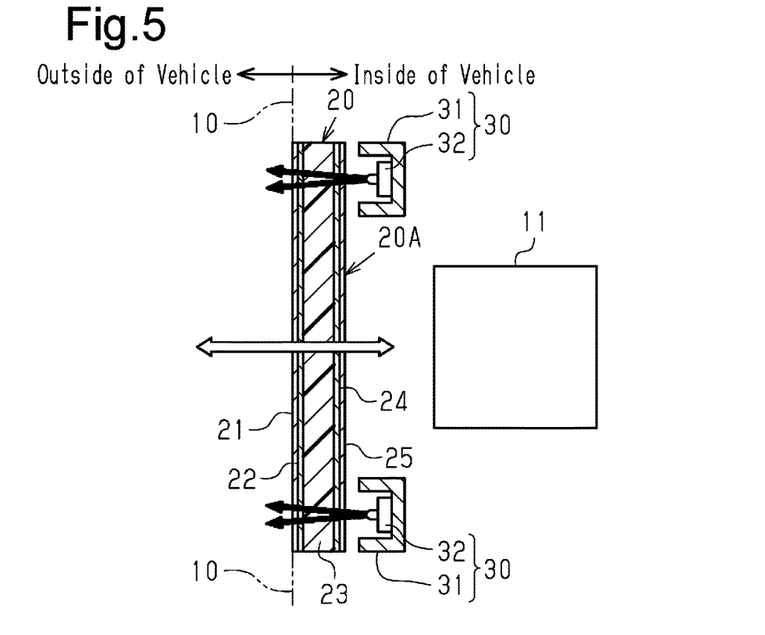
FIG. 5 is an operation diagram of the cover device for a near-infrared sensor according to the first embodiment.

As shown in FIGS. 4 and 5, the vehicle 10 includes the covers 20, each of which is arranged to cover the corresponding near-infrared sensor 11 from the front side in the transmission direction of near-infrared light transmitted from the near-infrared sensor 11 (indicated by the blank arrows in FIGS. 4 and 5). The near-infrared light transmittance of the cover 20 is set relatively high (90% in the present embodiment). Thus, the near-infrared light transmitted from the near-infrared sensor 11 and the near-infrared light that is reflected by an obstacle and returns pass through the cover 20. Since the cover 20 is prevented from hampering the transmission and reception of near-infrared light by the near-infrared sensor 11, the obstacle detecting function of the near-infrared sensor 11 is ensured.

In contrast, the transmittance of visible light (indicated by the solid arrows in FIGS. 4 and 5) of the cover 20 of the present embodiment is set relatively low (in the present embodiment, the sunlight transmittance is 50%).

Thus, as indicated by the solid arrows in FIG. 4, when visible light (sunlight) is incident on the cover 20 from the outside of the vehicle 10, part of the sunlight is reflected by the surface of the bright decorative layer 24 corresponding to the outside of the vehicle 10. This prevents the near-infrared sensor 11 from being easily seen from the outside of the vehicle 10. Therefore, the design of the part in which the near-infrared sensor 11 is provided is improved as compared to a case in which the near-infrared sensor 11 is attached to the vehicle 10 in an exposed state. In addition, the cover 20 is caused to shine using the reflection of the sunlight, which further improves the design of the part in which the cover 20 is provided. The color of the cover 20 when reflecting visible light (sunlight) and the color of the exterior component provided about the cover 20 (specifically, the bumper) may be the same color so that the cover 20 is inconspicuous.

As indicated by the solid arrows in FIG. 5, when the light emitting diodes 32 are turned on to emit visible light to the back surface 20A of the cover 20, part of the emitted visible light passes through the bright decorative layer 24 to cause the surface of the cover 20 that includes the bright decorative layer 24 and corresponds to the outside of the vehicle 10 to shine. Thus, in the present embodiment, the light emitting diodes 32 can be turned on at any time such as during night driving or automatic driving to cause the cover 20 to shine. This further improves the design of the part in which the cover 20 is provided.

In the cover 20 of the present embodiment, the bright decorative layer 24 is located closer to the near-infrared sensor 11 than the base 23, that is, on the side of the cover 20 of the multilayer structure that corresponds to the inner side of the vehicle 10. Therefore, the cover 20 is configured such that the bright decorative layer 24 is unlikely to be scratched by obstacles from the outside of the vehicle 10 as compared to a case in which the bright decorative layer 24 is located farther from the near-infrared sensor 11 than the base 23 (that is, a case in which the bright decorative layer 24 is located on the side of the base 23 corresponding to the outside of the vehicle 10). Accordingly, the design of the bright decorative layer 24 and the detection accuracy for obstacles are prevented from being deteriorated by scratches on the bright decorative layer 24 in a favorable manner.

As described above, the present embodiment provides the following advantages.

(1) The plate-shaped cover 20 is arranged in the vehicle 10 such that near-infrared light transmitted from the near-infrared sensor 11 passes through the cover 20 in the thickness direction. A part of the cover 20 in the thickness direction is constituted by the bright decorative layer 24, which reflects part of visible light and allows near-infrared light to pass through. The cover 20 is configured such that the near-infrared light transmittance is higher than the sunlight transmittance. In addition, the light emitting portion 30, which emits visible light to the cover 20, is provided. Accordingly, the design is further improved while ensuring the detection function of the near-infrared sensor 11.

(2) The bright decorative layer 24 of the cover 20 is located closer to the near-infrared sensor 11 than the base 23 (that is, the bright decorative layer 24 is located on the side of the base 23 that corresponds to the inner side of the vehicle 10). Accordingly, the design of the bright decorative layer 24 and the detection accuracy for obstacles are prevented from being deteriorated by scratches on the bright decorative layer 24.

(3) The light emitting portion 30 is arranged to emit visible light to the surface of the bright decorative layer 24 on the side closer to the near-infrared sensor 11. Since part of the visible light emitted by the light emitting portion 30 passes through the bright decorative layer 24, the passed-through visible light causes the bright decorative layer 24 to shine.

Second Embodiment

A cover device for a near-infrared sensor according to a second embodiment will now be described. Differences from the first embodiment will be mainly discussed. The same reference numerals are given to those components of the same functions as those in the first embodiment, and detailed explanations are omitted.

The present embodiment is different from the first embodiment mainly in the position in which the light emitting portion is arranged in relation to the cover. In the first embodiment, the light emitting portion 30 (refer to FIG. 2) is arranged to emit visible light to the surface of the bright decorative layer 24 on the side closer to the near-infrared sensor 11. In contrast, in the present embodiment, the light emitting portion is arranged to emit visible light to the surface of the bright decorative layer on the side farther from the near-infrared sensor 11.

A cover device for a near-infrared sensor according to the present embodiment will now be described.

Figure 6:
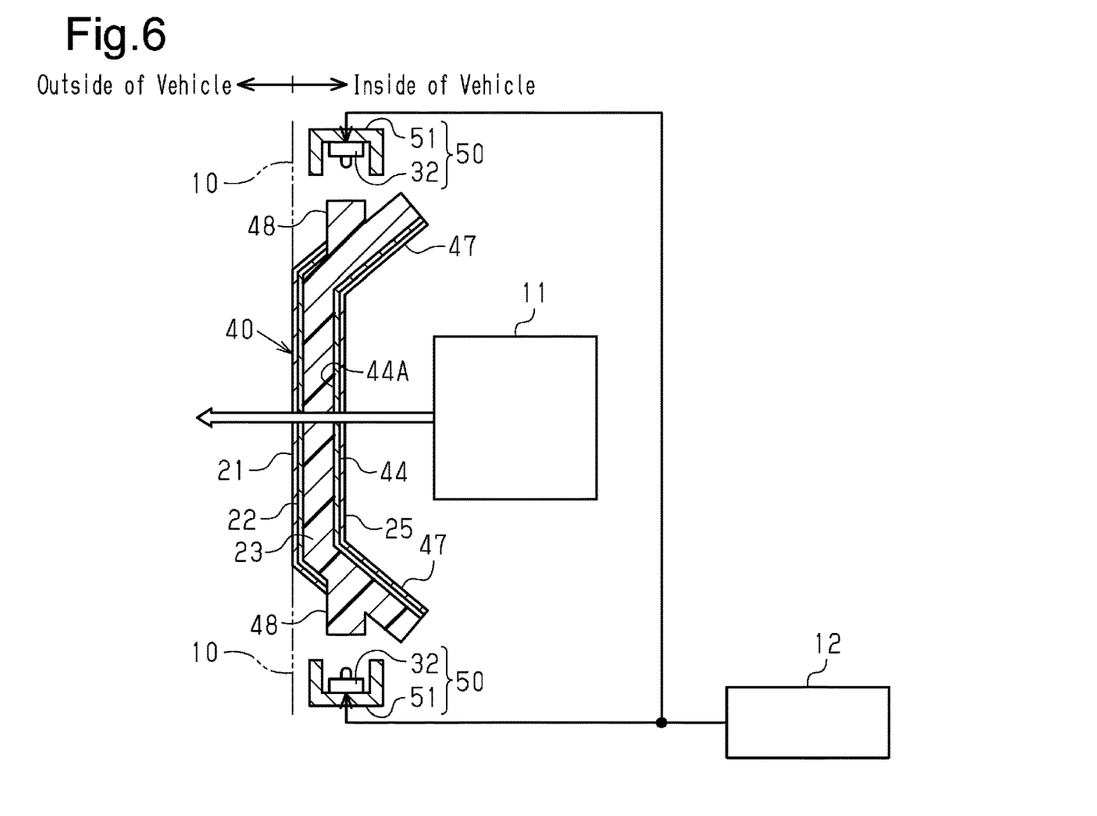
FIG. 6 is a cross-sectional side view of a cover device for a near-infrared sensor according to a second embodiment.

As shown in FIG. 6, a cover 40 is a plate having a five-layer structure. The cover 40 is an exterior component for a vehicle 10 and is fixed to the body of the vehicle 10. The cover 40 includes a reflection suppression layer 21, a hard coating layer 22, a base 23, a bright decorative layer 44, and a reflection suppression layer 25 in order from the side corresponding to the outside of the vehicle 10 (the left side in FIG. 6). In FIG. 6, the thickness of the reflection suppression layers 21, 25, the thickness of the hard coating layer 22, and the thickness of the bright decorative layer 44 are exaggerated in comparison with the actual thicknesses in order to facilitate understanding.

The bright decorative layer 44 of the present embodiment is made of a dielectric multilayer film that is formed by alternately laminating dielectric films made of a high refractive index material and dielectric films made of a low refractive index material, which has a relatively low refractive index. In the present embodiment, titanium dioxide [$TiO_2$] is used as the high refractive index material. In the present embodiment, silicon dioxide [$SiO_2$] is used as the low refractive index material. The bright decorative layer 44 reflects part of the incident visible light and allows most of the remaining light to pass through, while allowing most of the incident near-infrared light to pass through.

Figure 7:
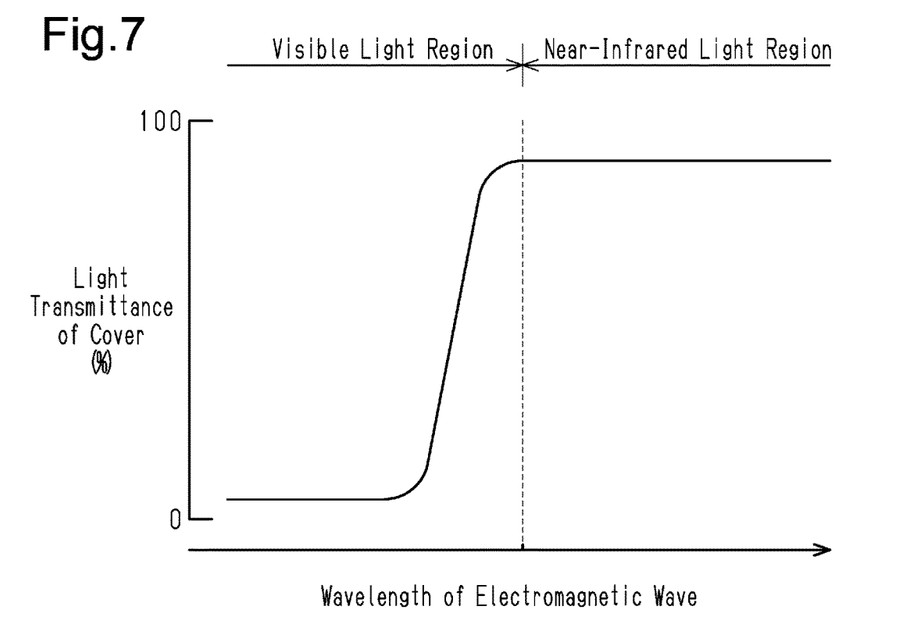
FIG. 7 is a graph showing the relationship between the wavelengths of electromagnetic waves and the light transmittance of the cover according to the second embodiment.

In the present embodiment, the cover 40 is configured such that the near-infrared light transmittance is higher than the visible light transmittance due to the above-described characteristics of the bright decorative layer 44. Specifically, in the cover 40 (specifically, in the part where the bright decorative layer 44 is provided), the characteristics of the respective layers of the cover 40 (the material, structure, and shape) are determined such that the visible light transmittance (specifically, the transmittance of sunlight, which has wavelengths in the range from 0.40 μm to 0.70 μm) is 5%, and the near-infrared light transmittance is 90% as shown in FIG. 7. More specifically, the cover 40 of the present embodiment is configured such that the average of the light transmittance in the wavelength region of sunlight (0.40 μm to 0.70 μm) is 5%.

The cover 40 includes an inclined portion 47 on the outer peripheral edge. The inclined portion 47 is inclined toward the near-infrared sensor 11 (toward the interior of the vehicle 10). The inclined portion 47 has protrusion 48, which is provided by protruding parts of the base 23 outward. The protrusion 48 has a shape of a closed loop extending continuously over the entire circumference of the inclined portion 47.

The vehicle 10 includes a light emitting portion 50, which has a shape of a closed loop continuously extending along the outer circumferential surface of the cover 40 (specifically, the protruding end of the protrusion 48, which has a shape of a closed loop). The light emitting portion 50 includes a case 51 having a shape of a closed loop and light emitting diodes 32 (only two of which are shown in FIG. 6). The case 51 extends along the protruding end of the protrusion 48. The light emitting diodes 32 are fixed to the bottom of the case 51. The case 51 extends to open toward the protruding end of the protrusion 48 and is fixed to the body of the vehicle 10. The light emitting diodes 32 are accommodated in the case 51 to be arranged at intervals along the outer circumferential surface of the cover 40.

When the light emitting diodes 32 in the case 51 are turned on, the light emitting portion 50 emits visible light into the base 23 in the cover 40 via the protrusion 48, specifically toward a surface 44A of the bright decorative layer 44 on the side farther from the near-infrared sensor 11.

The operation and advantages of the cover device for a near-infrared sensor of the present embodiment will now be described.

Figure 8:
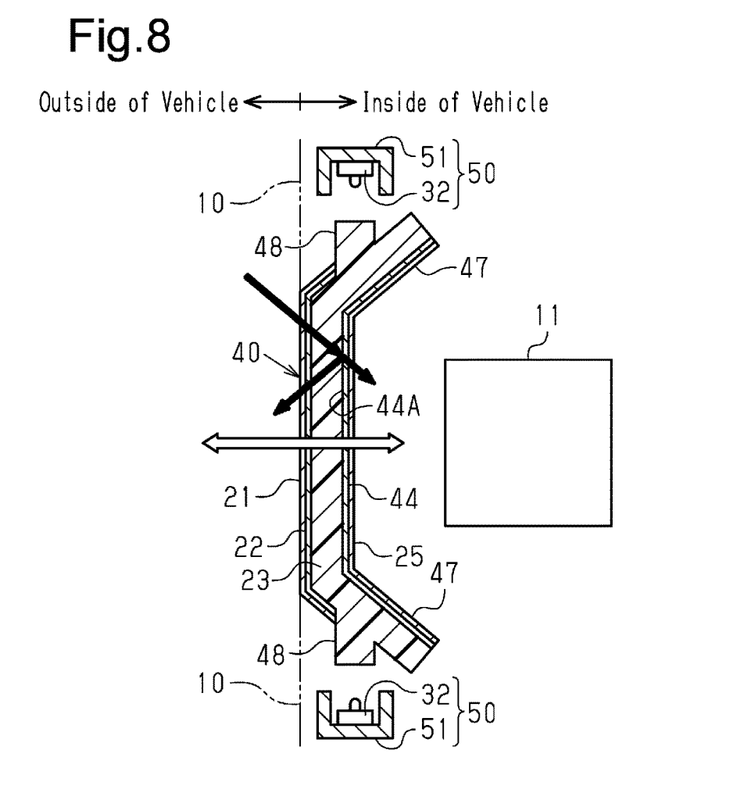
FIG. 8 is an operation diagram of the cover device for a near-infrared sensor according to the second embodiment.
Figure 9:
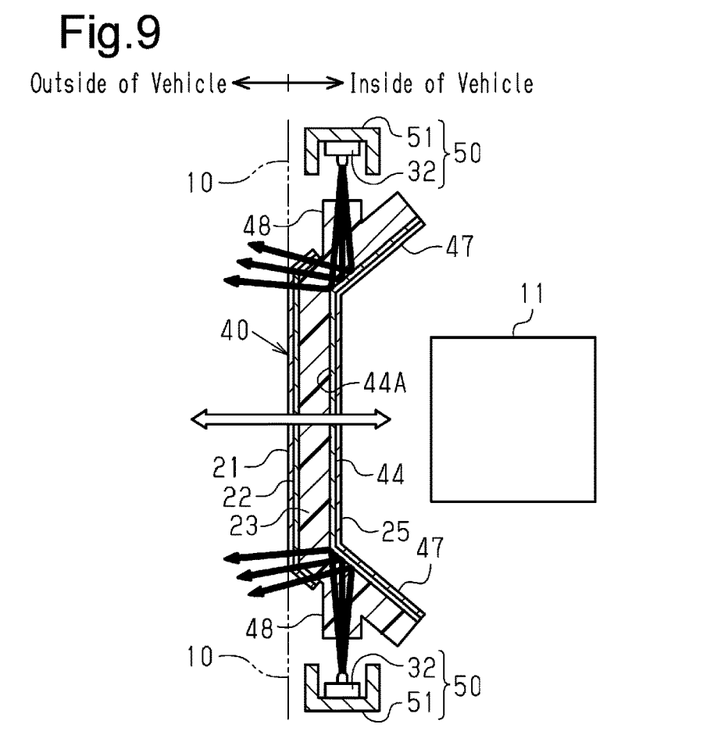
FIG. 9 is an operation diagram of the cover device for a near-infrared sensor according to the second embodiment.

As shown in FIGS. 8 and 9, the present embodiment includes the cover 40, which is arranged to cover a near-infrared sensor 11 from the front side in the transmission direction of near-infrared light transmitted from the near-infrared sensor 11 (indicated by the blank arrows in FIGS. 8 and 9). The near-infrared light transmittance of the cover 40 is set relatively high (90% in the present embodiment). Thus, the near-infrared light transmitted from the near-infrared sensor 11 and the near-infrared light that is reflected by an obstacle and returns pass through the cover 40. Since the cover 40 is prevented from hampering the transmission and reception of near-infrared light by the near-infrared sensor 11, the obstacle detecting function of the near-infrared sensor 11 is ensured.

In contrast, the transmittance of visible light (indicated by the solid arrows in FIGS. 8 and 9) of the cover 40 of the present embodiment is set relatively low (in the present embodiment, the sunlight transmittance is 5%).

Thus, as indicated by the solid arrows in FIG. 8, when visible light (sunlight) is incident on the cover 40 from the outside of the vehicle 10, part of the sunlight is reflected by the surface 44A of the bright decorative layer 44 corresponding to the outside of the vehicle 10. This prevents the near-infrared sensor 11 from being easily seen from the outside of the vehicle 10. Therefore, the design of the part in which the near-infrared sensor 11 is provided is improved as compared to a case in which the near-infrared sensor 11 is attached to the vehicle 10 in an exposed state. In addition, the cover 40 is caused to shine using the reflection of the sunlight, which further improves the design of the part in which the cover 40 is provided.

As indicated by the solid arrows in FIG. 9, when the light emitting diodes 32 are turned on so that visible light is emitted from the light emitting portion 50 toward the cover 40, the visible light reaches the surface 44A of the bright decorative layer 44 on the side farther from the near-infrared sensor 11 (the side corresponding to the outside of the vehicle 10) via the protrusion 48 and the base 23. Part of the visible light reaching the surface 44A on the side corresponding to the outside of the vehicle 10 is reflected by the surface 44A, so that the surface 44A shines. In addition, since the emitted visible light passes through the inside of the base 23, which functions as a light guide, the base 23 shines as the light passes through the base 23. Thus, in the present embodiment, the light emitting diodes 32 can be turned on at any time such as during night driving or automatic driving to cause the cover 40 to shine. This further improves the design of the part in which the cover 40 is provided.

In addition to the advantages (1) and (2) of the first embodiment, the present embodiment has the following advantage (4).

(4) The light emitting portion 50 is arranged to emit visible light to the surface 44A of the bright decorative layer 44 on the side farther from the near-infrared sensor 11 (the side corresponding to the outside of the vehicle 10). Thus, since part of the visible light emitted by the light emitting portion 50 is reflected by the surface 44A of the bright decorative layer 44 corresponding to the outside of the vehicle 10, the reflected visible light causes the bright decorative layer 44 to shine.

Other Embodiments

The above embodiments may be modified as follows.

Figure 10:
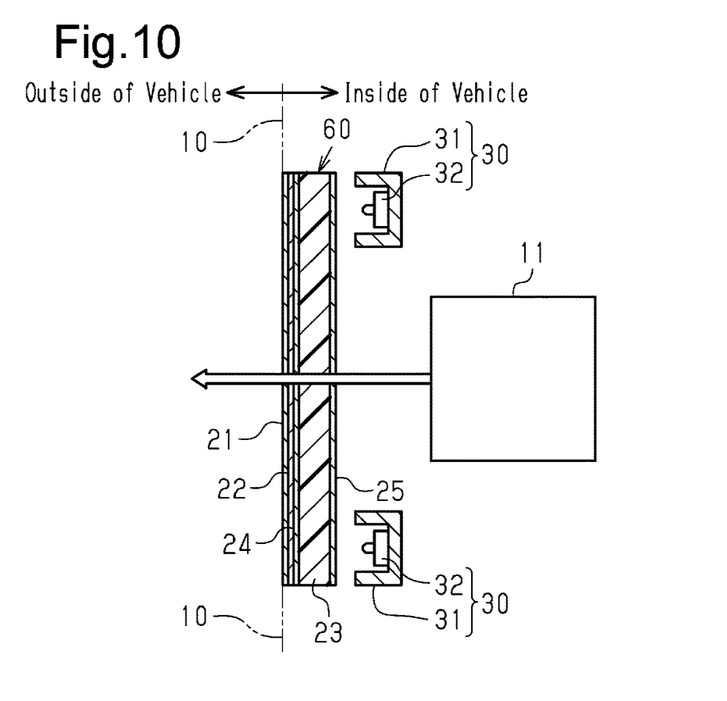
FIG. 10 is a cross-sectional side view of a cover device for a near-infrared sensor according to another embodiment.
Figure 11:
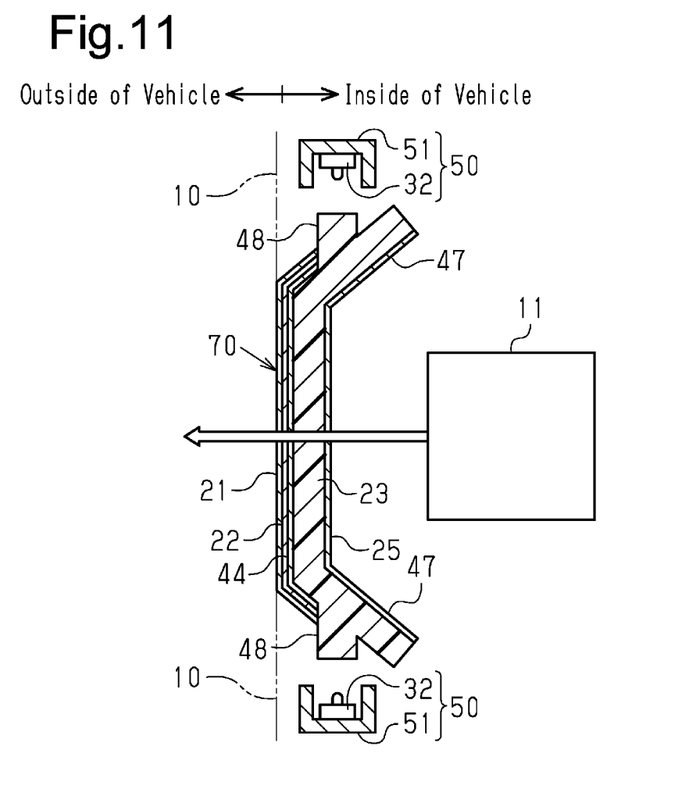
FIG. 11 is a cross-sectional side view of a cover device for a near-infrared sensor according to another embodiment.

A cover may be employed in which the bright decorative layer 24, 44 is located farther from the near-infrared sensor 11 than the base 23 (that is, the bright decorative layer 24, 44 may be located on the side of the base 23 that corresponds to the outer side of the vehicle 10). In this configuration, the bright decorative layer 24, 44 is located on the side of the base 23 corresponding to the outside of the vehicle 10. This allows the bright decorative layer 24, 44 to be easily seen from the outside of the vehicle 10 as compared to a case in which the bright decorative layer 24, 44 is located closer to the near-infrared sensor 11 than the base 23 (that is, a case in which the bright decorative layer 24, 44 is located on the side of the base 23 corresponding to the inner side of the vehicle 10). This allows the bright decorative layer 24, 44 to shine and thus improves the design of the cover in a favorable manner. FIGS. 10 and 11 illustrate concrete examples of such a cover device for a near-infrared sensor.

The example shown in FIG. 10 includes a cover 60 that is a plate having a five-layer structure. The same reference numerals are given to those components of the same functions as those in the first embodiment (see FIG. 2), and detailed explanations are omitted. In FIG. 10, the thickness of the reflection suppression layers 21, 25, the thickness of the hard coating layer 22, and the thickness of the bright decorative layer 24 are exaggerated in comparison with the actual thicknesses in order to facilitate understanding. The cover 60 includes a reflection suppression layer 21, a hard coating layer 22, a bright decorative layer 24, a base 23, and a reflection suppression layer 25 in order from the side corresponding to the outside of the vehicle 10 (the left side in FIG. 10). The light emitting portion 30 is provided to emit visible light on the back surface of the cover 60. In this case, the near-infrared light transmittance of the cover 60 is preferably set to 90%, and the light transmittance of sunlight of the cover 60 is preferably set to 50%. This configuration has advantages similar to the advantages (1) and (3) described above.

The example shown in FIG. 11 includes a cover 70 that is a plate having a five-layer structure. The same reference numerals are given to those components of the same functions as those in the second embodiment (see FIG. 6), and detailed explanations are omitted. In FIG. 11, the thickness of the reflection suppression layers 21, 25, the thickness of the hard coating layer 22, and the thickness of the bright decorative layer 44 are exaggerated in comparison with the actual thicknesses in order to facilitate understanding. The cover 70 includes a reflection suppression layer 21, a hard coating layer 22, a bright decorative layer 44, a base 23, and a reflection suppression layer 25 in order from the side corresponding to the outside of the vehicle 10 (the left side in FIG. 11). The light emitting portion 50 is provided to emit visible light on the protruding end of a protrusion 48 arranged on the outer circumference of the cover 70. In this case, the near-infrared light transmittance of the cover 70 is preferably set to 90%, and the light transmittance of sunlight of the cover 70 is preferably set to 50%.

In addition to advantages similar to the advantage (1) described above, this configuration has the following advantages. When the light emitting diodes 32 are turned on so that visible light is emitted from the light emitting portion 50 toward the cover 70, the visible light passes through the inside of the base 23. Since part of the visible light passing through the inside of the base 23 passes through the bright decorative layer 44, the surface of the bright decorative layer 44 on the side corresponding to the outside of the vehicle 10 (the left side in FIG. 11) shines. Thus, the light emitting diodes 32 can be turned on at any time such as during night driving or automatic driving to cause the cover 70 to shine. This further improves the design of the part in which the cover 70 is provided.

The high refractive index material and the low refractive index material that are used to form the dielectric films constituting the bright decorative layers 24, 44 may be changed. The high refractive index material may be, for example, aluminum oxide ($Al_2O_3$) or zirconium oxide ($ZrO_2$). The low refractive index material may be, for example, zinc peroxide ($ZnO_2$) or magnesium fluoride ($MgF_2$).

The near-infrared light transmittance and the visible light transmittance of the covers 20, 40, 60, 70 may be changed as long as the near-infrared light transmittance is sufficiently high for ensuring the detection function of the near-infrared sensor 11 and higher than the visible light transmittance (specifically, the transmittance of visible light in most of the wavelength regions except for visible light of wavelengths in the vicinity of the boundary with the near-infrared light range). Various experiments and simulations conducted by the inventors have revealed the following. In order to improve the design of the covers 20, 40, 60, 70 while ensuring the detection function of the near-infrared sensor 11, the transmittance of visible light in most of the wavelength regions is preferably set to the range from 5% to 50%.

The light emitting diodes 32 of the light emitting portions 30, 50 may be on at all times.

The light emitting diodes 32 may be replaced by another type of light emitters such as incandescent lamps.

The reflection suppression layers 21, 25 may be made of a material other than mesoporous silica. Such a material may be an antireflection film having a moth-eye structure ("moth-eye film") or a dielectric film having a single layer structure or a multilayer structure.

The hard coating layer 22 may be omitted.

The reflection suppression layers 21, 25 may be omitted.

The material for the base 23 may be polymethyl methacrylate (PMMA) or cycloolefin polymer (COP). The base 23 may be made of a translucent plastic.

The invention claimed is:

1. A cover device for a near-infrared sensor, the cover device being arranged to cover a near-infrared sensor from a front side in a transmission direction of near-infrared light transmitted from the near-infrared sensor, the cover device comprising:
    a plate shaped cover, wherein
    the cover is arranged in a vehicle such that near-infrared light transmitted from the near-infrared sensor passes through the cover in a thickness direction of the cover,
    a part of the cover in the thickness direction is constituted by a layer, which reflects part of incident visible light and allows near-infrared light to pass through, and
    the cover is configured such that a near-infrared light transmittance is higher than a visible light transmittance; and
    a light emitting portion that emits visible light to the cover, wherein
    the light emitting portion extends along an outer periphery of the cover, and
    the light emitting portion emits visible light to a surface of the layer on a side closer to the near-infrared sensor.

2. The cover device for a near-infrared sensor according to claim 1, wherein the visible light transmittance of the cover is higher than or equal to 5% and lower than or equal to 50%.

3. The cover device for a near-infrared sensor according to claim 1, wherein
    a main part of the cover in the thickness direction is constituted by a transparent or translucent base, and
    the layer is located closer to the near-infrared sensor than the base.

4. The cover device for a near-infrared sensor according to claim 1, wherein
    a main part of the cover in the thickness direction is constituted by a transparent or translucent base, and
    the layer is located farther from the near-infrared sensor than the base.

5. The cover device for a near-infrared sensor according to claim 1, wherein
    the cover includes, in order from a side corresponding to an outside of the vehicle,
    a hard coating layer that is made of a hard plastic,
    a base that is made of a transparent or translucent plastic, the base constituting a main part of the cover in the thickness direction,
    the layer, which reflects part of incident visible light and allows near-infrared light to pass through, and
    a near-infrared light reflection suppression layer that suppresses reflection of the near-infrared light transmitted from the near-infrared sensor.

6. The cover device for a near-infrared sensor according to claim 5, wherein
    the cover further includes a visible light reflection suppression layer,
    the visible light reflection suppression layer, the hard coating layer, the base, the layer, which reflects part of incident visible light and allows near-infrared light to pass through, and the near-infrared light reflection suppression layer of the cover are located in this order from the side corresponding to the outside of the vehicle, and
    the visible light reflection suppression layer suppresses reflection of visible light incident on the cover from outside the vehicle.

* * * * *